UNITED STATES PATENT OFFICE.

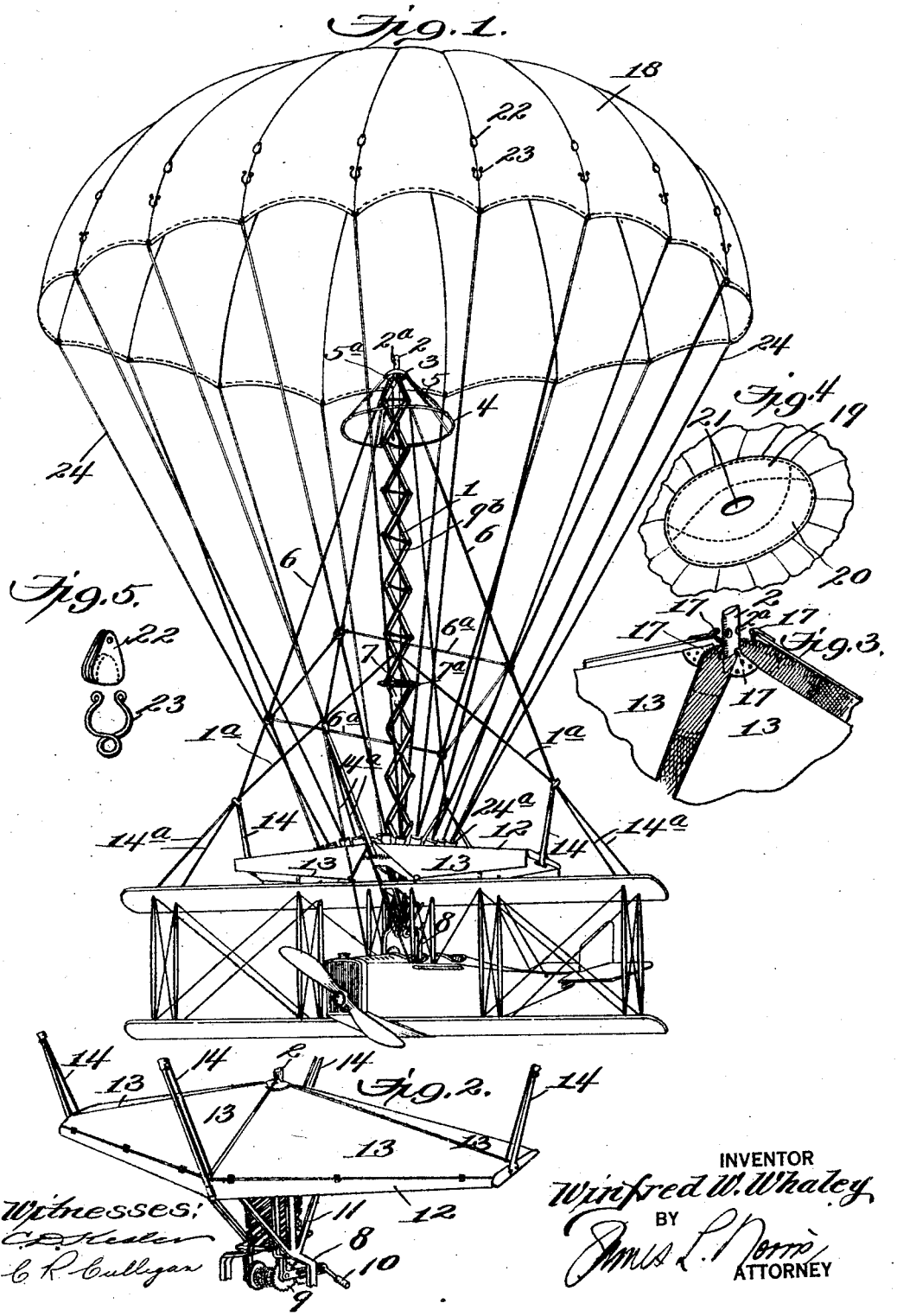

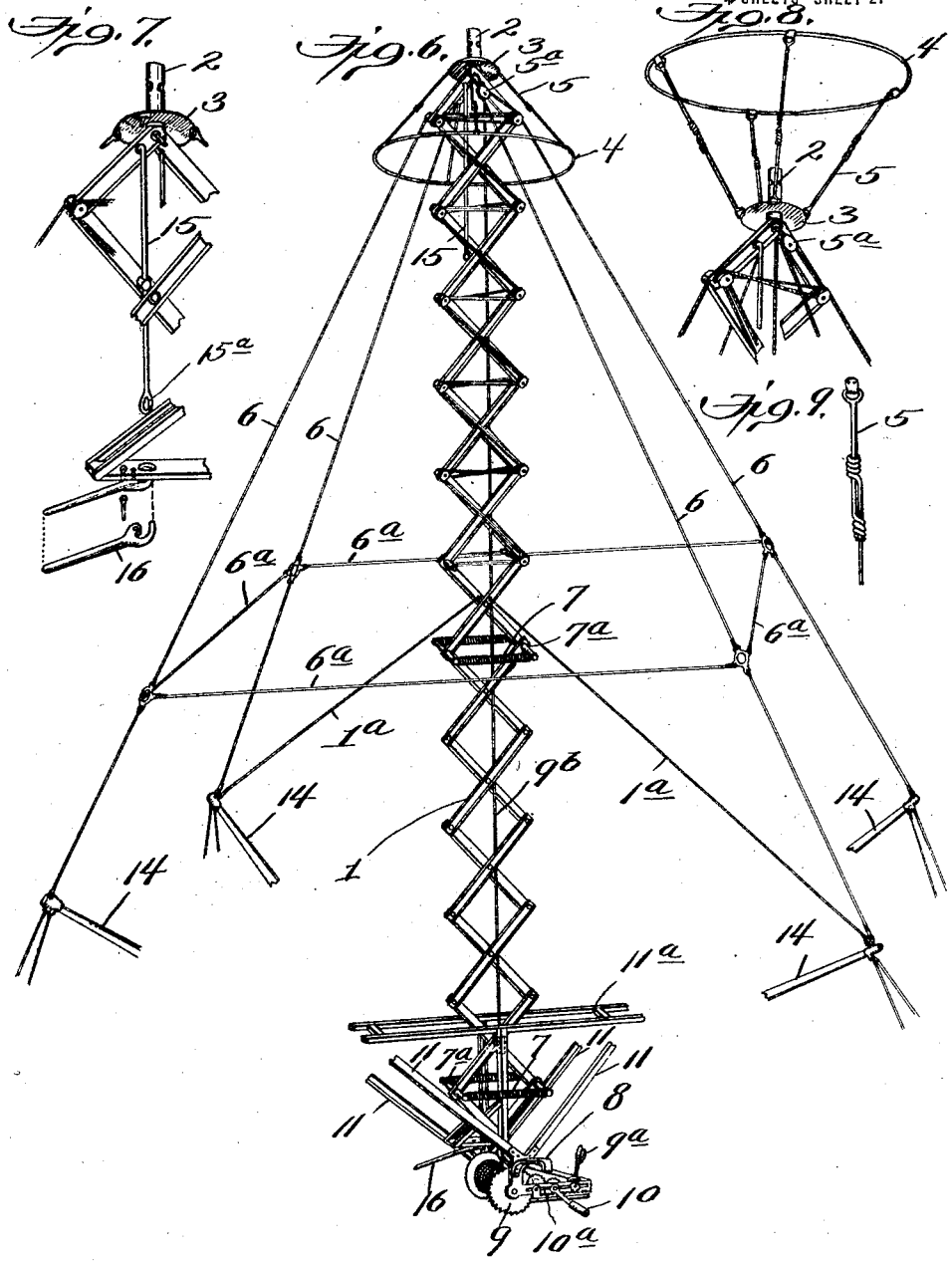

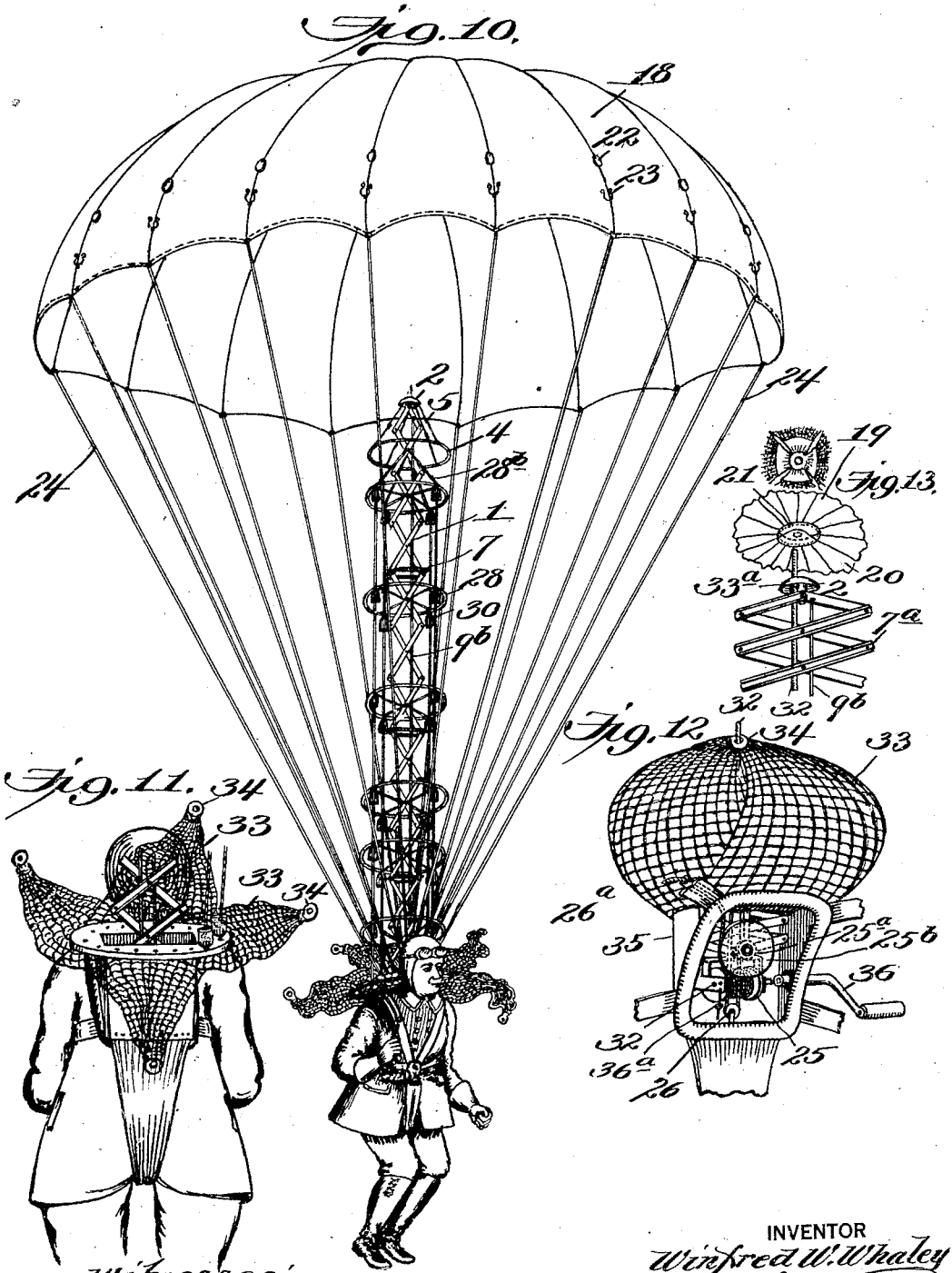

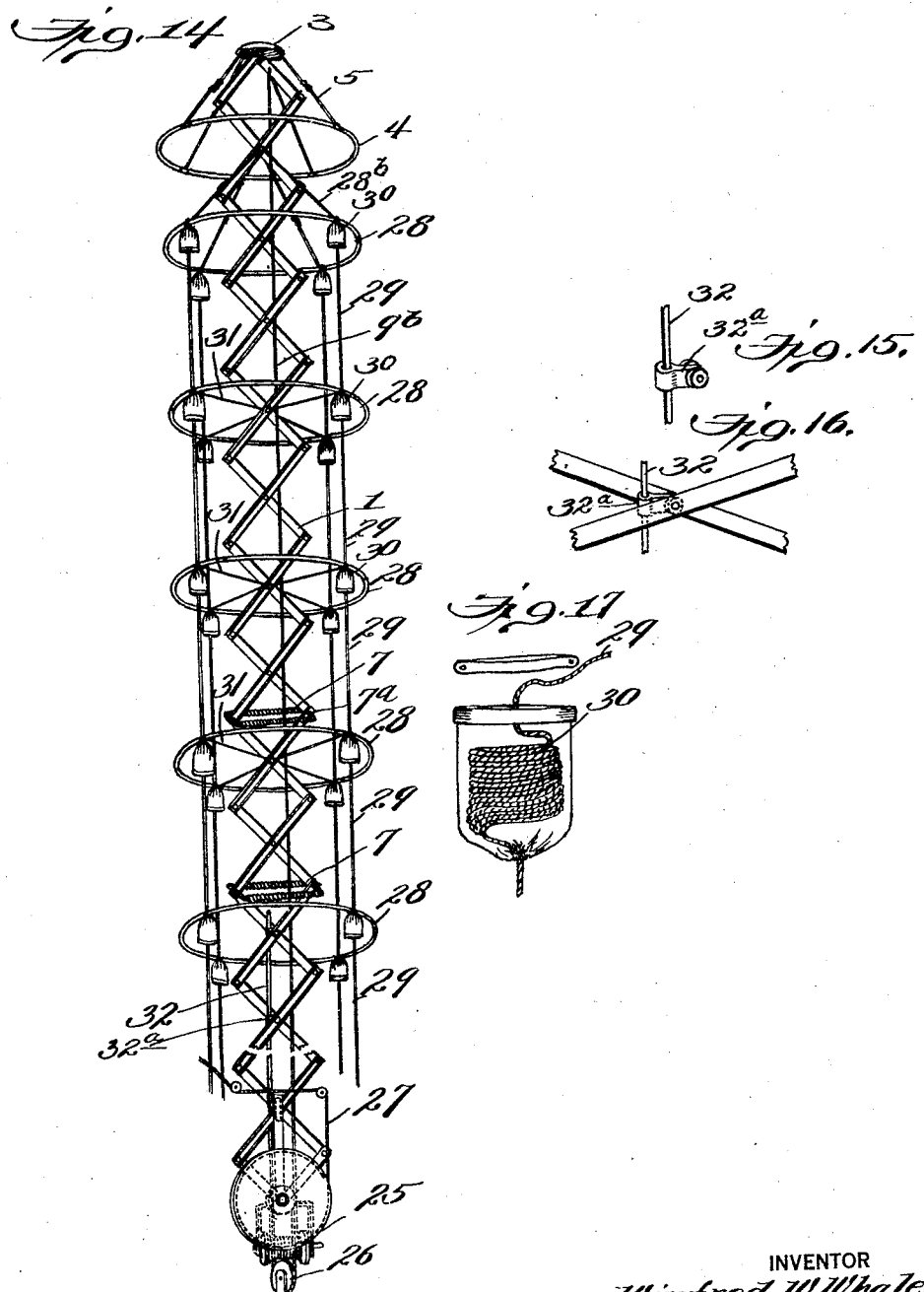

WINFRED W. WHALEY, OF WILMINGTON, NORTH CAROLINA.

PARACHUTE.

1,410,435.  Specification of Letters Patent.  Patented Mar. 21, 1922.

Application filed October 1, 1919. Serial No. 327,669.

*To all whom it may concern:*

Be it known that I, WINFRED W. WHALEY, a citizen of the United States, residing at Wilmington, in the county of New Hanover and State of North Carolina, have invented new and useful Improvements in Parachutes, of which the following is a specification.

This invention relates to aerial apparatus and more particularly to parachutes and apparatus for the operation of the same.

One of the objects of this invention is to provide an apparatus readily applicable to aircraft of any type to assist in controlling the descent of such aircraft in case of accident whereby the ordinary means for accomplishing a safe descent are incapacitated.

A modified form of the apparatus is provided which may be applied to and carried upon the person of an aviator and which is readily operable in case of necessity.

The proper distension of the parachute is also provided for as well as the stowing away of the apparatus in a most compact form when the same is in an inoperative position.

A further object is to provide a positively acting lock for maintaining the parachute projecting apparatus in a retracted position and a quick, effectual release for said projecting apparatus.

Provision is also made for so disposing and centering the parachute in its inoperative position that the most expeditious projection and distension is effected when the device is to be used.

Further objects are to automatically effect full distension of the parachute when the same is projected as well as to adjust the size of the parachute to varying loads.

With these and other objects in view, not specifically set forth hereinbefore, several of the embodiments of my invention are illustrated in the accompanying drawings, wherein:

Figure 1 is a perspective of one form of my improved device mounted upon an airplane.

Figure 2 is a side elevation of the parachute container and casing and a portion of the operating mechanism of the projecting apparatus.

Figure 3 is a side elevation of a portion of the closure for the container with the parachute and projecting apparatus nested therein.

Figure 4 is a plan in detail of the center top portion of the parachute cover.

Figure 5 is a detail of the clip used in adjusting the surface of the parachute.

Figure 6 is a side elevation of the projecting apparatus distended and the operating mechanism therefor.

Figure 7 is a detail of the locking means for the projecting apparatus.

Figure 8 is a side elevation of the upper end of the projecting apparatus showing the self-acting parachute distending mechanism in operative position.

Figure 9 is a detail of one of the extensible ribs of the self-acting parachute distender.

Figure 10 is an elevation of a modified form of the device fully distended, as applied to the person of an aviator.

Figure 11 is a rear elevation of a portion of the modified form, showing the means for carrying the apparatus upon the person.

Figure 12 is an elevation of the container and projecting apparatus.

Figure 13 is a detail of the elements of the locking mechanism of the modified form shown in Figures 11 and 12.

Figure 14 is a side elevation of a modified form of the projecting apparatus.

Figure 15 is a detail of a clip and guide for the locking rod shown in Figure 13.

Figure 16 is a detail of the guide as applied to the cross members of the lazy-tongs.

Figure 17 is a side elevation, partly in section, of the rope or tackle retaining sacks.

Referring to the drawings, wherein similar characters of reference indicate like parts throughout the several views.

A vertically disposed lazy-tong structure designated generally as 1 is provided at its upper end with a tip projection 2, which tip projection comprises an elongated body of suitable material provided with a series of recesses 2ª within its side faces. A cap 3 is mounted upon this tip projection, which cap supports by means of radially disposed links 5 the movable ring 4 which is constructed of wood or other suitable material and which has a lower face of such width as to provide a plane upon which currents of air may act as hereinafter discussed. The links 5 are made in sections which are freely slidable, the one on the other, and permit the ring to be moved from its normal pendant position shown in Figure 6 to its operative projected position shown in Figure 8.

Cables 6 extend upward from the base of the apparatus and pass over pulleys $5^a$, slung from the tip portion 2, which cables are rove in pairs and in opposite directions over suitable pulleys on the arms of the lazy-tong structure. These cables are connected at a suitable elevation, for example, about midway of the height of the tong structure by cross wires or cables $6^a$ which serve a purpose to be later described.

The tong structure 1 is provided adjacent its base, and at as many points throughout its height as may be necessary, with retractile springs 7 secured at each end to pins $7^a$ extending through and connecting the ends of the adjacent tong members.

The base of the tong structure comprises a bracket 8 in which is mounted a winding drum 9 which is operated through means of suitable gearing from crank 10. A usual form of locking pawl and lever $9^a$ is provided to lock the drum against rotation when desired. A retracting cable $9^b$ fastened at one end to an upper arm of the lazy-tong structure extends downward and is secured to and wound upon the drum 9.

Bracket supporting arms 11 extend upward from the bracket portion and are secured to frame $11^a$, which frame constitutes the base of a box-like container 12 which is completed by movably mounted cover members 13. Said container may carry upstanding brace arms 14, constructed of suitable material, wood being preferred, and which are so shaped as to offer a minimum resistance to the air. These arms 14 serve for the anchorage of the cables 6 whose ends are connected to suitable guys $14^a$ secured to appropriate parts of the airplane and are secured to the upper ends of said arms. Two of said arms may also serve for the anchorage of flexible oppositely disposed braces $1^a$ which are connected at a suitable elevation to the lazy-tong structure in order to hold it against undue lateral play.

The cover members 13 of the container have tongues or projections 17 formed on or attached to their ends adjacent their common point of contact, such projections fitting into and cooperating with recesses $2^a$ of the tip member 2 in order to effect a closure of the container when the device is in an inoperative position.

The parachute 18 has its top center portion provided with overlapping flaps 19 and 20, these being formed with apertures 21. This structure is provided in order that the parachute body may be centered upon the tip 2 of the tong structure when the device is in inoperative position, thus accelerating the projection and proper distension of the parachute when it is to be used. As soon as the parachute is projected the flaps assume relations wherein each closes the aperture 21 of the other.

Clasp members 22 and 23 are positioned a suitable distance apart on the ribs of the parachute. The member 22 is of inverted V-shape and has its edges channeled for the reception of wire clasp 23. These clasp members enable adjustments of the effective area of the parachute in accordance with the load and may be sewed or otherwise attached to the parachute body or ribs a suitable distance apart, that depending, of course, upon the adjustment to be made.

The parachute is held and secured by means of ropes 24, said ropes normally being coiled in the receptacles $24^a$. In order to maintain the parachute in position relative to the aircraft and to the projecting apparatus four or more of the ropes 24 may be passed through eyelets at the ends of the brace wires $6^a$.

The retracted lazy-tong structure and the parachute proper are nested within the container 12, the tip projection 2 of the lazy-tong structure projecting through the alining apertures 21 in the center top portion of the parachute and the tongue members 17 of the cover portions 13 engaging in the recesses $2^a$ of the tip projection to form a closure for the container. The lazy-tong structure is positively locked in its retracted position, preferably by the device shown in Figure 7 which comprises a rod 15 depending from one of the upper members of the lazy-tong and having at its lower end an eye $15^a$ for cooperation with a manually operated latch finger 16 pivoted to a suitable part of the frame 11 and in easy reach. It will thus be seen that the parachute is so centered in the container above the projection apparatus as to make for the most expeditious projection and distension. The operation of the device presupposes that the locking pawl and lever $9^a$ are released from engagement with gears $10^a$ and that the lazy-tong structure is held retracted by the latch finger 16. The retractile springs 7 are constantly acting upon the pivoted lazy-tong arms, which springs, when the finger 16 is disengaged from the eye $15^a$, project the lazy-tong structure upward, throwing back the cover members 13. The parachute 18 is carried upward by the projection apparatus and in connection with the fall of the plane the currents of air will immediately begin to act upon the parachute to distend the same. As the lazy-tong structure is projected the cross-wires $6^a$ assume the form of a frame which spreads open the lower portion of the parachute, thus mechanically aiding its distension. As the ring 4 moves in either direction consequent to air pressure, supporting arms 5 telescope and shorten until they are co-planar with said ring and thereafter extend until the ring assumes either of the positions shown in Figures 6 or 8. In case the external vacuum influence should impede the distension of the central portion of the parachute the ring 4 comes into action and mechanically initiates such distension, that is to say, the air pressure accumulating within the parachute will project the ring 4 to the position shown in Figure 8, and thus projected, the ring will spread at the central portion of the parachute and overcome the retarding effect of the external vacuum influence.

When the parachute projecting structure has served its purpose and is to be retracted, the rope or cable 9$^b$ is wound upon drum 9 by actuating hand crank 10, which winding quickly retracts the lazy-tong structure. Guy ropes 24 of the parachute are coiled in container sacks 24$^a$, the parachute centered on tip projection 2, and the covers 13 of container 12 closed, the winding drum 9 being locked against rotation by the pawl 9$^a$.

The operation of the area-adjusting clasps for the parachute cover surfaces is obvious from the drawings, the clasp members being connected when it is desired to adjust the parachute for a light load and released when it is desired to enlarge the surface of the apparatus.

In the modification illustrated in Figures 10 to 17 of the drawings wherein the apparatus is shown in a form adapted to be carried upon the person of the operator, the lazy-tong structure 1, the cap member 2 and the self-acting distending ring 4, the extensible ring-supporting arms 5, and the retractile springs 7 are of the form shown in Figures 1 to 9. The container or carrying case of this modified form comprises the body portion 35 and the flexible cover members 33 which are provided at their ends with eyelets 34. A winding drum 25 for the retracting cable 9$^b$ is mounted within the body portion 35 and is actuated by means of hand crank 36.

The lazy-tong structure is normally held retracted by a vertical latch rod 32 whose lower end is connected to a cord 36$^a$ trained over an idler sheave 26 and a winding sheave 25$^a$ mounted within the body portion 35. The sheave 25$^a$ is mounted fast with a coaxial sheave 25$^b$ upon which is secured an operating cord 26$^a$ which passes through an opening in the body portion 35 and has a free end within easy reach of the operator. The rod 32 passes slidably through guides 32$^a$ carried by the lazy-tong structure and through an aperture in the cap 2, and at its upper end projects with latching effect through the eyelets 34. By pulling upon the cord 25$^a$ the rod 32 is pulled down to disengage the cover members 33 and release the lazy-tong structure. A suitable number of distending members 28 are provided for the purpose of mechanically aiding the distension of the parachute. The upper frame member is supported from the lazy-tong structure by cords 28$^a$. The remaining members are suspended from one another by cords 29 and carry receptacles 30 into which the cords 29 may be coiled when the device is retracted. The members 28 discharge a function similar to that of the part 6$^a$ of the previous embodiment, and like said frame, surround the lazy-tong structure.

In the operation of the modified form, the apparatus is strapped or otherwise secured to the back of the operator, the lazy-tong structure and the parachute cover and guy ropes being enclosed by cover members 33, as shown in Figure 12. A pull is exerted upon latch-operating cord 26$^a$ which withdraws latch rod 32 from the eyelets 34. The lazy-tong organization is then projected upward in the manner explained, the ring 4 acting, as previously described, to insure distension of the central portion of the parachute and the rings 28 acting to initiate the distension of the parachute throughout its length.

To retract the lazy-tong device and pack the apparatus in the container, the hand crank 36 is turned, winding up rope 9$^b$ which draws in the lazy-tong. The cords 29 of the parachute are coiled in the receptacles 30 and latch rod 32 is passed through the aperture in the cap 2 of the lazy-tong structure, the alined holes 21 of the center portion of the parachute cover and the superposed eyelets 34 of the cover portions 33.

Having fully described my invention, I claim:—

1. Parachute apparatus comprising in combination a parachute and means including a plane arranged to be acted on by air pressure beneath it during descent of the parachute and cooperative with the parachute to aid distension.

2. Parachute apparatus comprising in combination a foldable parachute, a member for projecting the parachute, and means to cooperate with the upper end of said member above the parachute for locking said member in retracted position when the parachute is retracted and folded.

3. In a device of the character described, a parachute, and means for adjusting the surface of said parachute proportionally to the load to be carried comprising axially spaced clasps operative when engaged to reduce the effective diameter of said surface.

4. Parachute apparatus comprising a parachute, means for projecting it, the parachute and projecting means being collapsible, segmental parachute-covering means covering the parachute when collapsed, and means to connect the parachute and projecting means while collapsed for centering the parachute relatively to the projecting means.

5. In a device of the character described, a parachute, means for projecting said parachute, means for retracting said projecting means, means for locking said projecting means in retracted position, a container adapted to hold said parachute and projecting means, cover members for said container, and means carried by said projecting apparatus acting with means carried by said cover members to effect a closure of said container.

6. In a device of the character described, in combination, a parachute, a projecting mechanism therefor, air pressure actuated parachute distending means cooperative with the underside of the parachute carried by said projecting mechanism, and means for extending and contracting said projecting mechanism.

7. In a device of the character described, in combination, a parachute, a projecting mechanism therefor, air pressure actuated parachute distending means carried by said projecting mechanism, said self-acting distending apparatus comprising a member suspended by telescopic ribs, and means for extending and contracting said projecting mechanism.

8. Parachute apparatus comprising in combination a parachute, vertically extensible means for projecting the parachute, means for retracting and thus lowering said projecting means, and means for locking the projecting means in retracted position comprising a bolt member attached to the top of said extensible member and arranged to project above the parachute when the latter is retracted and a retaining member also arranged above the parachute when the latter is retracted and cooperative with the bolt member of said extensible means.

9. A device of the character described, comprising, in combination, a parachute, extensible means for projecting said parachute, air pressure actuated means carried at the upper end of said projecting means for initiating the distension of said parachute, a container for said parachute and projecting means when collapsed, and manually operable means for releasing said parachute and projecting means from said container.

10. A device of the character described, comprising, in combination, a parachute, means for projecting said parachute, air pressure actuated means carried by said projecting means and cooperative with the underside of the parachute for initiating the distension of said parachute, a container for said parachute and projecting means and manually operable means for releasing said parachute and projecting means from said container, and means for securing said parachute and projecting apparatus in said container.

11. A device of the character described, comprising, in combination, a parachute, vertically-extensible means for projecting said parachute, air pressure actuated means carried at the upper end of said vertically-extensible means for initiating the distension of said parachute, a container for said parachute and projecting means, and manually operable means for releasing said parachute and projecting means from said container, and means cooperative with the upper end of said projecting means for securing said parachute and projecting means in said container, said container comprising a body portion and segmental cover members.

12. A device of the character described, comprising, in combination, a parachute, means for mechanically projecting said parachute, air pressure actuated means for initiating the distension of said parachute, a container for said parachute and projecting means, and manually operable means for releasing said parachute and projecting means from said container, means connected to the upper part of said projecting means for securing said parachute and projecting means in said container, said container comprising a body portion and segmental cover members, and means for centering said parachute in said container.

13. In a device of the character described, in combination with a parachute, parachute projecting means, and means for initiating distension of the parachute, comprising members suspended from and circumscribed about said projecting apparatus, and means comprising a locking bolt for securing said projecting apparatus in retracted position, and guide members carried by said projecting apparatus to coact with said locking means.

14. A device of the character described, comprising, in combination, a parachute, vertically-extensible means for projecting said parachute, and means comprising a rod secured at one end to the upper part of said projecting means and having its free end extending upwardly through the parachute when the parachute is retracted and folded and said projecting means are in a retracted position to retain said projecting means in retracted position.

15. A device of the character described, comprising, in combination, a parachute, means for projecting said parachute, and means suspended from and circumscribed about said projecting means when fully extended to guard said projecting means against lateral movement.

16. In a device of the character described, in combination, a parachute, projecting mechanism therefor, air pressure actuated means comprising a ring-shaped member suspended by freely slidable telescopic arms for automatically initiating distension of said parachute.

In testimony whereof I have hereunto set my hand in presence of two subscribing witnesses.

WINFRED W. WHALEY.

Witnesses:
W. J. TOOMER,
THEODOR S. JAMES.